(12) United States Patent
Rogge et al.

(10) Patent No.: US 8,746,076 B2
(45) Date of Patent: Jun. 10, 2014

(54) SHAPE SENSING USING A MULTI-CORE OPTICAL FIBER HAVING AN ARBITRARY INITIAL SHAPE IN THE PRESENCE OF EXTRINSIC FORCES

(75) Inventors: Matthew D. Rogge, Norfolk, VA (US); Jason P. Moore, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 185 days.

(21) Appl. No.: 13/591,320

(22) Filed: Aug. 22, 2012

(65) Prior Publication Data

US 2014/0053654 A1 Feb. 27, 2014

(51) Int. Cl.
*G01L 1/24* (2006.01)

(52) U.S. Cl.
CPC ........................................ *G01L 1/24* (2013.01)
USPC .............................................. 73/800; 385/12

(58) Field of Classification Search
CPC ........... A61B 19/5261; A61B 19/2203; A61B 1/0051; A61B 5/065; A61B 19/5244; A61B 2019/223; A61B 2019/2242; A61B 2019/461; A61B 1/00009; A61B 1/05; A61B 2019/2211; A61B 2019/2223; G01L 1/246; G01L 1/242; G01L 5/226; G01M 11/083; G02B 6/02042; G02B 6/022; G02B 6/3616; G02B 6/3644; G02B 6/3887; G02B 6/00; G01B 21/22; G01B 11/18; G01B 21/042; G01B 11/165
USPC ............................ 33/551; 73/800; 385/12, 13
See application file for complete search history.

(56) References Cited

U.S. PATENT DOCUMENTS

| 6,256,090 B1 | 7/2001 | Chen et al. |
| 6,545,760 B1 | 4/2003 | Froggatt et al. |
| 7,331,436 B1 | 2/2008 | Pack et al. |
| 7,720,322 B2 * | 5/2010 | Prisco ............................. 385/12 |

(Continued)

FOREIGN PATENT DOCUMENTS

WO PCT/US2010/024360 8/2010

OTHER PUBLICATIONS

Klute, Sandra M., et al., "Fiber-Optic Shape Sensing and Distributed Strain Measurements on a Morphing Chevron," 44th AIAA Aerospace Sciences Meeting & Exhibit, Jan. 9-12, 2006, pp. 1-23, Reno, Nevada.

(Continued)

*Primary Examiner* — Yaritza Guadalupe-McCall
(74) *Attorney, Agent, or Firm* — Andrea Z. Warmbier

(57) ABSTRACT

Shape of a multi-core optical fiber is determined by positioning the fiber in an arbitrary initial shape and measuring strain over the fiber's length using strain sensors. A three-coordinate p-vector is defined for each core as a function of the distance of the corresponding cores from a center point of the fiber and a bending angle of the cores. The method includes calculating, via a controller, an applied strain value of the fiber using the p-vector and the measured strain for each core, and calculating strain due to bending as a function of the measured and the applied strain values. Additionally, an apparent local curvature vector is defined for each core as a function of the calculated strain due to bending. Curvature and bend direction are calculated using the apparent local curvature vector, and fiber shape is determined via the controller using the calculated curvature and bend direction.

20 Claims, 2 Drawing Sheets

(56) References Cited

U.S. PATENT DOCUMENTS

| | | | |
|---|---|---|---|
| 7,772,541 B2 | 8/2010 | Froggatt et al. | |
| 7,781,724 B2 | 8/2010 | Childers et al. | |
| 7,813,599 B2 | 10/2010 | Moore | |
| 8,050,523 B2* | 11/2011 | Younge et al. | 385/13 |
| 8,116,601 B2* | 2/2012 | Prisco | 385/12 |
| 8,358,883 B2* | 1/2013 | Prisco | 385/12 |
| 8,515,215 B2* | 8/2013 | Younge et al. | 385/13 |
| 2002/0041722 A1 | 4/2002 | Johnson et al. | |
| 2004/0074307 A1* | 4/2004 | Tjin | 73/800 |
| 2006/0013523 A1* | 1/2006 | Childers et al. | 385/12 |
| 2007/0065077 A1 | 3/2007 | Childers et al. | |
| 2007/0297711 A1* | 12/2007 | Childers et al. | 385/12 |
| 2008/0212082 A1 | 9/2008 | Froggatt et al. | |
| 2008/0285909 A1* | 11/2008 | Younge et al. | 385/13 |
| 2009/0046276 A1 | 2/2009 | Moore | |
| 2009/0324161 A1 | 12/2009 | Prisco | |
| 2010/0215311 A1 | 8/2010 | Moore | |
| 2011/0109898 A1 | 5/2011 | Froggatt et al. | |
| 2011/0113852 A1 | 5/2011 | Prisco | |
| 2011/0247427 A1 | 10/2011 | Froggatt et al. | |
| 2011/0319714 A1 | 12/2011 | Roelle et al. | |
| 2011/0319910 A1 | 12/2011 | Roelle et al. | |
| 2012/0132009 A1* | 5/2012 | Prisco | 73/800 |
| 2012/0316432 A1* | 12/2012 | Younge et al. | 385/12 |
| 2012/0321243 A1* | 12/2012 | Younge et al. | 385/13 |
| 2012/0323075 A1* | 12/2012 | Younge et al. | 385/13 |
| 2013/0276557 A1* | 10/2013 | Duindam et al. | 73/865.8 |
| 2013/0308138 A1* | 11/2013 | 'T Hooft et al. | 356/601 |
| 2014/0033825 A1* | 2/2014 | Ravet | 73/800 |
| 2014/0053654 A1* | 2/2014 | Rogge et al. | 73/800 |
| 2014/0105534 A1* | 4/2014 | Rogers et al. | 385/12 |

OTHER PUBLICATIONS

Gray, Alfred, "Modern Differential Geometry of Curves and Surfaces," 1993, pp. 125-127 and 146, CRC Press, Boca Raton, Florida.

Gander, M. J., et al., "Bend measurement using Bragg gratings in multicore fibre," Electronics Letters, Jan. 20, 2000, pp. 120-121, vol. 36, No. 2.

Luna Innovations Incorporated, Press Release, http://ir.lunainnovations.com/phoenix.zhtml?c=196907&p=irol-newsArticle2&ID=1015478&highlight, Jun. 14, 2007.

Hansen Medical, Press Release, http://phx.corporate-ir.net/phoenix.zhtml?c=202676&p=irol-newsArticle_print&ID=1523690&highlight=, Feb. 3, 2011.

Langer, Joel and David A. Singer, "Lagrangian Aspects of the Kirchhoff Elastic Rod," SIAM Review, Dec. 1996, pp. 605-618, vol. 38, No. 4.

International Search Report, PCT/US2010/024360, Apr. 16, 2010.

International Search Report, PCT/US2013/25057, Apr. 17, 2013.

* cited by examiner

SHAPE SENSING USING A MULTI-CORE OPTICAL FIBER HAVING AN ARBITRARY INITIAL SHAPE IN THE PRESENCE OF EXTRINSIC FORCES

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefor.

ORIGIN OF THE INVENTION

The invention described herein was made by employees of the United States Government and may be manufactured and used by or for the Government for governmental purposes without payment of any royalties thereon or therefor.

TECHNICAL FIELD

The present disclosure relates generally to fiber optic shape sensing, and in particular to a system and method for fiber optic shape sensing using a multi-core fiber having an arbitrary initial shape and extrinsic forces acting on the fiber.

BACKGROUND OF THE INVENTION

Single-core and multi-core optical fibers are used in a variety of applications. In a single-core optical fiber, a single light-guiding core is contained within reflective cladding material. A multi-core optical fiber includes a plurality of such cores. Strain sensors such as Fiber Bragg Gratings (FBGs) may be attached to or embedded within the fiber along the fiber's length. FBGs may be formed by laser-inscribing, writing, or otherwise embedding a periodic variation of refractive index into the cores of the optical fiber. This effectively creates an in-line optical filter designed to block particular wavelengths of light transmitted through or along the core. Alternatively, Rayleigh scatter detectors can be used to detect elastic light scatter occurring within a given core at specific axial locations of the optical fiber. Using these and/or other strain sensors, the bending geometry of the optical fiber can be calculated. The calculated geometric data may be used in various ways to approximate the shape of an object to which the cable is attached.

Strain information from axially co-located strain sensors can be used to estimate the bending at each co-located sensor location along the fiber. Common methods for accomplishing this exist, including, those outlined by S. Klute et al. in "Fiber Optic Shape Sensing & Distributed Strain Measurements on a Morphing Chevron", $44^{th}$ American Institute of Aeronautics and Astronautics (AIAA) Aerospace Sciences Meeting & Exhibit, #AIAA 2006-624, Jan. 9-12, 2006, Reno, Nev. Such methods are highly dependent on the accuracy of successive strain measurements used to calculate the cable's bending parameters at discrete segments of the cable.

When a multi-core cable in particular is subjected to bending, the strain in each core depends on the curvature and direction of the bend, as well as on the arrangement of the various constituent cores within the cable in relation to the bending direction. In accordance with linear elastic tube theory, a light-guiding core positioned on the inside of a bend experiences a stress, i.e., a negative strain, while a core positioned on the outside of the bend experiences a positive strain. The amount of strain is proportional to the bend radius and to the position of each core relative to the center of the bend curve. Therefore, multi-core fibers can have additional utility in comparison to single core fibers when used for structural shape sensing and end effecter tracking.

Conventional fiber optic shape sensing approaches initialize and calibrate the sensors while the fiber is straight, i.e., when the fiber initially has zero curvature and zero strain. U.S. Pat. No. 7,813,599 to Moore (hereinafter Moore '599), which is hereby incorporated by reference in its entirety, is one such approach. However, in practical applications it may be relatively difficult to maintain a known core orientation, and thus the angular core orientation is not always known. Using conventional methods, the calibration of strain sensors while the fiber is in an arbitrary initial shape, which may or may not be straight, may introduce a bias error that can lead to a substantial error in shape measurement.

Additionally, conventional shape sensing approaches do not adequately account for the effects of common extrinsic forces on the fiber such as twisting and/or stretching. Extrinsic axial loading may be introduced into the fiber through attachment mechanisms such as adhesives or tape, by general handling of the fiber as in a catheter application, or by friction inside of a sheathing which may house the fiber in a given application. Such extrinsic loading can cause shape measurement errors to occur in prior art approaches for determining the shape and/or position of a multi-core fiber.

SUMMARY OF THE INVENTION

A system and method are disclosed herein for determining the shape, and thus the end position, of a multi-fiber cable having an arbitrary initial shape, i.e., a shape that is not necessarily straight. For instance, the cable may be curved, or the cable may be wound on a spool in a helical shape. The fiber of the cable may be free-sleeved as in Moore '599 or it may be bound to a sleeve of the cable without changing the present approach. Moreover, the present approach may be used even when external/extrinsic pinching and/or pulling forces are present, which may ultimately cause extrinsic twisting and/or elongation of the fiber. As noted above, such extrinsic forces are not adequately accounted for in the prior art.

Additionally, the present approach enables the accurate calculation of curvature and bend direction using a multi-core fiber with an arbitrary angular core orientation. Prior art approaches require a carefully calibrated angular core orientation before any shape measurements can be made. The present approach by contrast enables initialization of a multi-core fiber with arbitrary core orientations in an arbitrary shape. This in turn enables the use of substantially longer lengths of fiber in practical applications. In the absence of the present system and method, initialization of a long length of fiber would require a complex apparatus and/or a large work area. In addition, the present curvature calculation approach is insensitive to external strain-inducing effects such as temperature and tensile stress.

The present method also allows for shape sensing of complex structures without calibrating angular core orientations relative to the structure. As an example if a sleeve is woven into the fabric of an inflatable structure for the purpose of containing a multi-core shape sensing fiber, it can prove difficult to maintain a known angular core orientation while insetting the multi-core fiber into the sleeve. The present approach eliminates the need for angular core orientation cognizance during or subsequent to such an installation.

In particular, a method of determining the shape of a multi-core fiber optic cable includes positioning the cable in au arbitrary initial shape and measuring strain over a length of the cable using a plurality of strain sensors while the cable is held in the arbitrary initial shape. The strain sensors are distributed along a corresponding length of each of the cores of the cable. The method may include defining a three-coordinate p-vector for each core as a function of the distance of the corresponding cores from a center point of the fiber and a bending angle of the corresponding cores with respect to a local axis of the fiber, wherein the coordinates of the p-vector define a plane.

The method may also include calculating, via a controller, an applied strain value of the fiber using the p-vector and the measured strain for each core, and calculating strain due to bending as a function of the measured strain and the applied strain value. Additionally, the method may include defining an apparent local curvature vector for each core as a function of the calculated strain due to bending, calculating curvature and bend direction of the fiber using the apparent local curvature vector and an initial curvature vector, and determining the shape of the cable via the controller using the calculated curvature and bend direction.

A system for determining a three-dimensional (3D) shape of a multi-core optical fiber includes a fiber optic cable and a controller. The cable includes an optical fiber with light-guiding cores and strain sensors. The strain sensors each measure strain at a different axial location of a particular core. The controller calculates, using the measured strain, an applied strain value as an axial strain component experienced by all of the cores due to at least temperature and axial load acting on the cable. The controller also calculates strain due to bending of the fiber as a function of the measured strain and the applied strain value, and defines an apparent local curvature vector for each core as a function of the calculated strain due to bending.

Additionally, the controller calculates curvature and bend direction of the fiber using the apparent local curvature vector and the initial curvature vector, generates a curvature function, a bending function, a twisting function, and a strain function by performing a curve-fitting, operation, and calculates a function of torsion vs. fiber length of the cable, including differentiating the bending function, and then adding the twisting function. The controller can determine the shape of the cable in part by solving a set of Frenet-Serret equations using each of the curvature function, the bending function, the twisting function, and the strain function. In this manner the controller can derive the shape of the cable in a three-dimensional space.

In another embodiment, a method of determining the shape of a multi-core fiber optic cable in the presence of extrinsic twisting and stretching forces includes recording discrete measured sets for each of: curvature, bending, twisting, and strain of the cable, and then performing a curve-fitting operation on each measured set to generate a curvature function, a bending function, a twisting function, and a strain function. A controller is then used to calculate a function of torsion vs. fiber length of the cable, including differentiating the bending function and then adding the twist function. The controller determines the shape of the cable in part by solving a set of Frenet-Serret equations. The equations use each of the curvature function, a bending function, a twisting function, and a strain function to thereby derive the shape of the cable in a three-dimensional space.

The above features and advantages and other features and advantages of the present invention are readily apparent from the following detailed description of the best modes for carrying out the invention when taken in connection with the accompanying drawings.

DETAILED DESCRIPTION OF THE INVENTION

Figure 1:
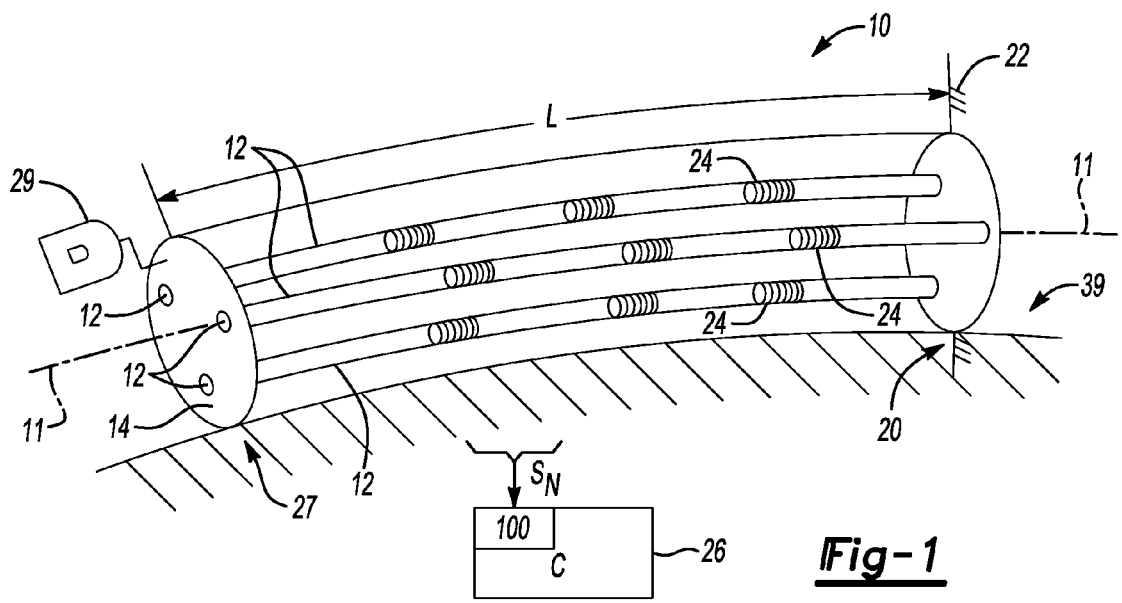
FIG. 1 is a schematic perspective side view of a system for determining the three-dimensional (3D) shape and end position of an optical fiber.
Figure 1A:
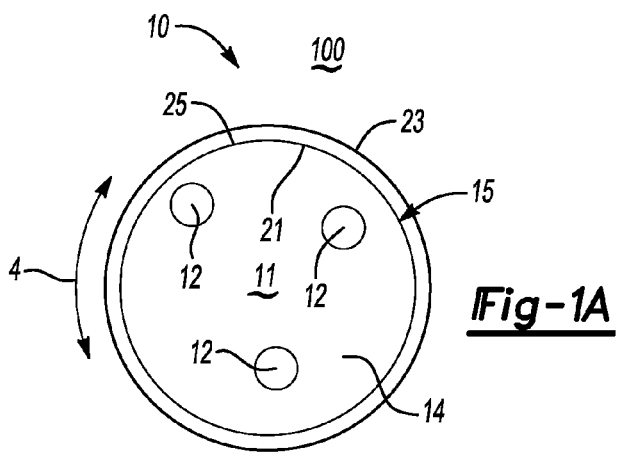
FIG. 1A is a schematic cross-sectional illustration of a fiber optic cable used in the system shown in FIG. 1.
Figure 2:
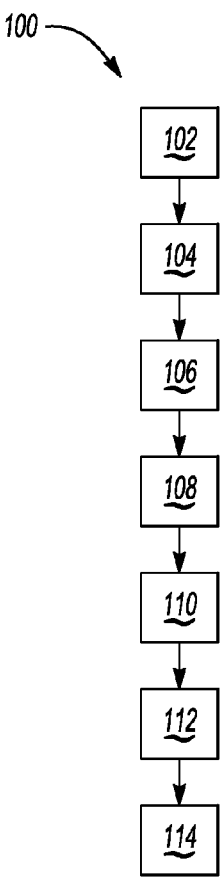
FIG. 2 is a flow chart describing an example method for determining the 3D shape of an optical fiber using the system shown in FIG. 1.

Referring to the drawings, wherein like reference numbers represent like components throughout the several Figures, an overview of the basic construction of a multi-core fiber optic cable 10 is presented first with respect to FIGS. 1 and 1A. This description is followed by an explanation of how a controller 26 may be used to execute the present method 100, an example of which is shown in FIG. 2, in order to calculate strain and bending data for the cable 10 when initialized from an arbitrary initial shape, which may be straight or non-straight. Additionally, the controller 26 does not require an initial zero-strain state to function, and thus overcomes limitations of prior art systems in this respect. The handling of external/extrinsic forces on the cable 10 is discussed below with reference to FIGS. 5 and 6.

The example cable 10 of FIG. 1 has a longitudinal axis or centerline 11 and a length (L). A plurality of light-guiding cores 12 are arranged within the cable 10. A three-core embodiment will be used hereinafter for illustrative consistency, although the present invention is not limited to this particular embodiment. Bach core 12 is positioned with respect to the centerline 11 and is surrounded by a layer of reflective cladding material 14. The cores 12 and the cladding material 14 may be constructed of a suitable polymer. The cores 12 have a high transparency, while the cladding material 14 has a low refractive index relative to the material of the cores 12. Thus, any light emitted into one end of each core 12 is efficiently transmitted along the entire length (L) of the cable 10 via total internal reflection, as is well understood in the art.

Structural shape sensing and end-effector tracking may be performed using multi-core optical fibers as noted above. Strain information from axially co-located sensors 24, such as Fiber Bragg Gratings (FBGs) or Rayleigh scatter detectors, can be used to estimate the bending at each co-located sensor location along the fiber. Because the strain measurements are referenced to some initial state, prior work such as that of Moore '599 can be used to calibrate the sensors 24 while the fiber is in a straight state, i.e., a state having zero curvature.

Certain mathematical solutions presented in Moore may be used in the present approach, particularly those solutions using known Frenet-Serret curvature equations. However, critical adjustments are made via the present approach for calibrating the sensors 24 in fibers having an arbitrary initial state, i.e., a shape that may or may not be straight. The present approach is therefore directed toward the calibration of the sensors 24 and a determination of the true orientation of the cores 12 while the cable 10 is positioned in an arbitrary initial shape.

Multi-core fiber optic shape sensing requires that strain measurements be taken in each core 12 in order to properly determine curvature and bend direction. Because such strain measurements are relative to some initial material state, the initial or reference state must be accurately defined. The initial state can be defined by the curvature and bend direction of the cable 10 for all measurement locations. When the initial state is straight, subsequent bent shapes will result in compressive strain for cores 12 on the inside of the bend and tensile strain on the outside of the bend. As the current state of the art relies on the assumption that the initial shape is always straight, any deviation from that assumption would tend to cause error in the measured shape. The present approach as set forth below with reference to FIGS. 2-6 helps solve this particular problem.

Referring briefly to FIG. 1A, the cable 10 shown in FIG. 1 includes an optical fiber 15 having multiple cores 12, the cladding material 14 noted above, and a protective polymeric layer or coating 21 bonded to the cladding material 14. The cable 10 may also include a protective sleeve 23 constructed of a suitably rugged polymeric material, with the sleeve 23 circumscribing the optical fiber 15 along to form an interface 25. The optical fiber 15 in one embodiment is unbound, i.e., free to rotate or twist within the sleeve 23 at or along the interface 25 with little to no friction, as indicated by the double arrow 4. That is, the sleeve 23 is not bonded, adhered, or otherwise attached to the optical fiber 15 at the interface 25 anywhere along the length L, thereby allowing the optical fiber 15 to freely twist and untwist with respect to the sleeve 23 as needed. In another embodiment the sleeve 23 may be at least partially bound at the interface 25, such as by bonding or attachment, or may otherwise experience surface friction between the sleeve 23 and the fiber 15. The present approach works well with both embodiments.

Referring again to FIG. 1, the cores 12 may be positioned substantially equidistant from and symmetrically with respect to the centerline 11, although other configurations can be used within the scope of the invention. Each core 12 is concentrically surrounded by the cladding material 14. For clarity, the cladding material 14 is shown only at the end portions of FIG. 1 in order to show the cores 12 and other internal detail of the optical fiber 15. Likewise, the sleeve 23 of FIG. 1A is omitted from FIG. 1 for further clarity in depicting the cores 12.

The cable 10 of FIG. 1 includes a plurality of sensors 24 that are inscribed, written, embedded, or otherwise provided at intermittent axial positions along the length L. The sensors 24 are configured to measure a set of strain data, and to relay the set of strain data, collectively represented in FIG. 1 as $S_N$, to a sensor interrogation device or controller 26. The controller 26 is configured to determine the shape of the optical fiber 15 via the methods 100 and 200 as set forth below with reference to respective FIGS. 2 and 6 using the strain data $S_N$.

In an example of a potential utility for the cable 10, 3D shape and/or end position sensing of the cable 10 can be achieved in conjunction with a device 29, such as but not limited to a piece of minimally invasive surgical equipment or a tethered device such as a submersible vessel used in deep ocean exploration, a tethered camera of the type used during on-orbit heat shield tile inspection or other types, tethered robots used for search, rescue, and recovery operations, e.g., in collapsed mineshafts or in structures having compromised stability after an earthquake, etc.

The device 29 may be connected to an end 27 of the cable 10, with the sleeve 23 (see FIG. 1A) of the cable 10 in turn connected to an object 39 such as another set of motion-control cables or wiring used for controlling the direction, operation, and/or motion of the device 29 as needed. The controller 26 determines the 3D shape and end position of the optical fiber 15 of FIG. 1A as set forth below, with the 3D shape and end position usable thereafter for a variety of purposes, including for determining the precise position in 3D space of the device 29.

In addition to the end 27, the cable 10 has a bound end 20 providing a calibrated end position. In other words, the cable 10 is secured at the bound end 20, such as by attachment to a stationary member 22, e.g., a surface of a surface, nautical, submersible, or orbital vessel, vehicle, or other device used in conjunction with the device 27. However configured, the bound end 20 represents a known initial condition usable by the method 100 for determining a shape of the optical fiber 15, and maintains a known initial tangent vector and a calibrated twist orientation as explained below. The shape the cable 10 takes with respect to the bound end 20 may be non-straight. For instance, a helical shape is common on a spool-wound cable.

As noted above with reference to FIG. 1A, the optical fiber 15 may be unbound or freely-sleeved, i.e., allowed to freely twist within the sleeve 23 at, along, or with respect to the interface 25 as its own elasticity governs in order to minimize internal stresses along its length L, while also conforming to the turns and bends of the cable 10. Allowing the optical fiber 15 to freely twist and untwist in this manner enables the laws of elastic tube theory to apply, while also permitting explicitly-defined functions of curvature, bending direction, and torsion to follow the known Frenet-Serret curvature equations. The application of such equations is set forth below and in detail in Moore '599. However, the present approach is not limited to freely-sleeved fibers.

Referring to FIG. 2, an example embodiment of the present method 100 is described for sensing the shape of an object from an arbitrary initial state or shape.

Initialization

At step 102, the cable 10 of FIG. 1 is placed into an arbitrary initial shape, which includes any shape that the user desires, whether straight or non-straight. For instance, the cable 10 may be curved, straight, or shaped as a helix. The cable 10 thus has a known or determinable initial curvature vector when positioned in the arbitrary initial shape, which may be recorded by or otherwise made available to the controller 26. The ability to use an arbitrary initial shape enables initialization of a relatively long length of fiber while the cable 10 is, for instance, compactly held on a spool. The actual shape of the cable 10 is not limited.

As part of step 102, the fiber 15 of FIG. 1A may be connected to a suitable interrogating system such as the controller 26 of FIG. 1 once the fiber 15 is in the arbitrary initial shape. The controller 26 is then initialized, a step which may include initializing strain measurement via the sensor 24.

Strain Measurement

At step 104, the fiber 15 may be placed in a shape to be measured once the controller 26 has been properly initialized at step 102. The controller 26 may then request measurement of strain via, the sensors 24. There can be three or more sensors 24 at each sensor location along the length (L) of the cable 10 shown in FIG. 1, typically one sensor 24 per core 12 per location. For instance, a controller 26 that is interrogating sensors 24 in the form of FBGs may record the Bragg wavelength for all sensors 24 in the cable 10. Other types of sensors may be used in lieu of FBGs to measure the strain in the cable 10.

Figure 3:
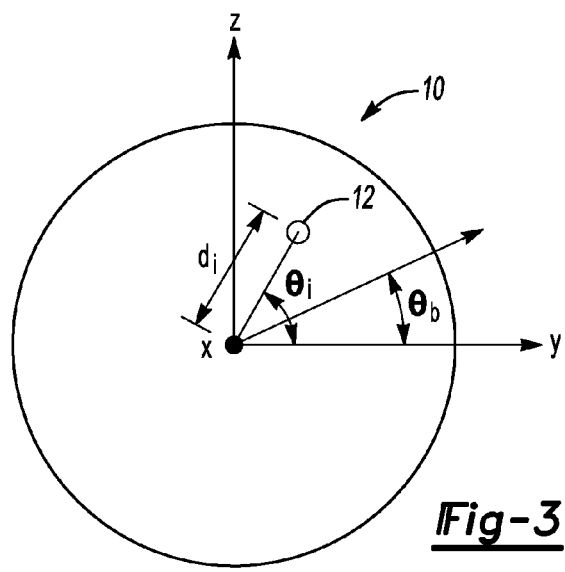
FIG. 3 is a schematic illustration of a unit circle for defining local axes and core locations.

Referring briefly to FIG. 3, certain terms used in the equations described below are shown graphically for illustrative clarity, i.e., the local axes x, y, and z the locations of a core 12, and the bend direction $\theta_b$. The measured strain is incurred by a number of factors. The fiber 15 of FIG. 1A may experience strain that is not due to bending, e.g., strain due to temperature changes along its length, tensile loading, humidity variations, etc., in addition to the strain that is experienced due to bending. The additional strain not due to bending is referred to hereinafter as the applied strain. Due to linear superposition, the measured strain at a given core 12 can be determined as follows:

$$\epsilon_{t,i} = \epsilon_a + \epsilon_i; \; \epsilon_i = -\kappa d_i \cos(\theta_b - \theta_i)$$

where:
- $\epsilon_{t,i}$ is total strain measured at the i-th core;
- $\epsilon_a$ is the applied strain experienced by all cores along their neutral axes due to temperature, axial load, etc.;
- $\epsilon_i$ is axial strain at the i-th core due to bending;
- $\kappa$ is curvature (a scalar);
- $d_i$ is distance from the i-th core to center of fiber;
- $\theta_b$ is the angle from local y-axis to bend axis; and
- $\theta_i$ is the angle from local y-axis to the i-th core.

Calculating Core Strain Due to Bending

At step 106, assuming the applied strain components are experienced equally by each core 12 of FIG. 1, the bending strain components can be calculated as follows. First, one may define a "p-vector" for each core 12 as a function of the distance $d_i$ and angle $\theta_i$:

$$p_i = \begin{bmatrix} d_i \cos \theta_i \\ d_i \sin \theta_i \\ \epsilon_{t,i} \end{bmatrix}$$

These vectors define the three dimensional (3D) coordinates for each core 12 where the first and second components are the y and z components of the core location and the third component is the measured strain in the core 12. The three coordinates define a plane. The normal vector of this plane is:

$$n = (p_2 - p_1) \times (p_3 - p_1)$$

The applied strain value ($\epsilon_a$) at y,z=0 is the axial strain component experienced by all cores 12 due to temperature, axial load, etc., and is equal to:

$$\epsilon_a = \frac{n \cdot p_1}{n \cdot [0 \; 0 \; 1]} = \frac{n \cdot p_2}{n \cdot [0 \; 0 \; 1]} = \frac{n \cdot p_3}{n \cdot [0 \; 0 \; 1]} \quad (0)$$

The strain due to bending ($\epsilon_i$) can then be calculated as the total measured strain less the applied strain, $$\epsilon_i = \epsilon_{t,i} - \epsilon_a$$

The strain due to bending is then used in subsequent steps.

Calculating Curvature and Bend Direction

At step 108, an apparent local curvature vector is defined for each core 12, which points to the respective core 12 from the center point of fiber 15 (see FIG. 1A), and has magnitude equal to:

$$\kappa_{app,i} = -\frac{\epsilon_i}{d_i}$$

Using unit vectors $\hat{j}$ and $\hat{k}$ in the local y- and z-axes, respectively:

$$\kappa_{app,i} = -\frac{\epsilon_i}{d_i}\left(\cos\theta_i \hat{j} + \sin\theta_i \hat{k}\right)$$

The vector sum of the apparent curvature vectors for M cores is then formulated as:

$$\kappa_{app} = -\sum_{i=1}^{M} \frac{\epsilon_i}{d_i} \cos\theta_i \hat{j} - \sum_{i=1}^{M} \frac{\epsilon_i}{d_i} \sin\theta_i \hat{j} \quad (1)$$

The magnitude of this vector from equation (1) is:

$$|\kappa_{app}| = \sqrt{\left(\sum_{i=1}^{M} \frac{\epsilon_i}{d_i}\cos\theta_i\right)^2 + \left(\sum_{i=1}^{M} \frac{\epsilon_i}{d_i}\sin\theta_i\right)^2} \quad (2)$$

By substituting the expression for strain from equation (1):

$$\kappa_{app} = \kappa \sum_{i=1}^{M} \cos(\theta_b - \theta_i)\cos\theta_i \hat{j} + \kappa \sum_{i=1}^{M} \cos(\theta_b - \theta_i)\sin\theta_i \hat{k}$$

The magnitude of this vector is calculated as:

$$|\kappa_{app}| = \kappa \sqrt{\left(\sum_{i=1}^{M} \cos(\theta_b - \theta_i)\cos\theta_i\right)^2 + \left(\sum_{i=1}^{M} \cos(\theta_b - \theta_i)\sin\theta_i\right)^2} \quad (3)$$

In general, the core locations may not be symmetric about the fiber axis, so equation (3) can be rearranged to express $\kappa$ explicitly. Incorporating equation (2) for the magnitude of the apparent curvature vector gives:

$$\kappa = \frac{|\kappa_{app}|}{\sqrt{\left(\sum_{i=1}^{M}\cos(\theta_b-\theta_i)\right)^2 + \left(\sum_{i+1}^{M}\cos(\theta_b-\theta_i)\sin\theta_i\right)^2}} = \frac{\sqrt{\left(\sum_{i=1}^{M}\frac{\epsilon_i}{d_i}\cos\theta_i\right)^2 + \left(\sum_{i=1}^{M}\frac{\epsilon_i}{d_i}\sin\theta_i\right)^2}}{\sqrt{\left(\sum_{i=1}^{M}\cos(\theta_b-\theta_i)\cos\theta_i\right)^2 + \left(\sum_{i=1}^{M}\cos(\theta_b-\theta_i)\sin\theta_i\right)^2}} \quad (4)$$

In the case of non-symmetric cores 12, the bend angle must first be determined using any previously reported suitable method. For symmetric cores 12, further manipulation yields a simplified result that does not require the calculation of bend angle.

Equation (3) may be expanded as follows:

$$|\kappa_{app}| = \kappa\sqrt{\left(\sum_{i=1}^{M}(\cos\theta_b\cos\theta_i + \sin\theta_b\sin\theta_i)\cos\theta_i\right)^2 + \left(\sum_{i=1}^{M}(\cos\theta_b\cos\theta_i + \sin\theta_b\sin\theta_i)\right)^2}$$

Distributing:

$$|\kappa_{app}| = \kappa\sqrt{\left(\cos\theta_b\sum_{i=1}^{M}\cos^2\theta_i + \sin\theta_b\sum_{i=1}^{M}\sin\theta_i\cos\theta_i\right)^2 + \left(\cos\theta_b\sum_{i=1}^{M}\cos\theta_i\sin\theta_i + \sin\theta_b\sum_{i=1}^{M}\sin^2\theta_i\right)^2}$$

Using trigonometric identities:

$$|\kappa_{app}| = \kappa\sqrt{\left(\frac{\cos\theta_b}{2}\sum_{i=1}^{M}(1+\cos2\theta_i) + \frac{\sin\theta_b}{2}\sum_{i=1}^{M}\sin2\theta_i\right)^2 + \left(\frac{\cos\theta_b}{2}\sum_{i=1}^{M}\sin2\theta_i + \frac{\sin\theta_b}{2}\sum_{i=1}^{M}(1-\cos2\theta_i)\right)^2}$$

Simplifying:

$$|\kappa_{app}| = \kappa\sqrt{\left(\frac{\cos\theta_b}{2}\left(M + \sum_{i=1}^{M}\cos2\theta_i\right) + \frac{\sin\theta_b}{2}\sum_{i=1}^{M}\sin2\theta_i\right)^2 + \left(\frac{\cos\theta_b}{2}\sum_{i=1}^{M}\sin2\theta_i + \frac{\sin\theta_b}{2}\left(M - \sum_{i=1}^{M}\cos2\theta_i\right)\right)^2}$$

When the cores 12 of FIG. 1A are symmetrically spaced about center of the fiber 15:

$$\theta_i = \theta_1 + \frac{2\pi}{M}(i-1) \quad (5)$$

By identity, when equation (5) is satisfied:

$$\sum_{i=1}^{M}\cos2\theta_i = \frac{\sin\left(M\frac{2\pi}{M}\right)\cos\left(2\theta_1 + (M-1)\frac{2\pi}{M}\right)}{\sin\frac{2\pi}{M}} = 0$$

$$\sum_{i=1}^{M}\sin2\theta_i = \frac{\sin\left(M\frac{2\pi}{M}\right)\sin\left(2\theta_1 + (M-1)\frac{2\pi}{M}\right)}{\sin\frac{2\pi}{M}} = 0$$

Therefore:

$$|\kappa_{app}| = \kappa\sqrt{\left(\frac{\cos\theta_b}{2}M\right)^2 + \left(\frac{\sin\theta_b}{2}M\right)^2} = \kappa\sqrt{\frac{M^2}{4}(\cos^2\theta_b + \sin^2\theta_b)} = \frac{\kappa M}{2}$$

Curvature can be calculated using the measured apparent curvature vector magnitude from equation (2) above:

$$\kappa = \frac{2|\kappa_{app}|}{M} \quad (6)$$

Bend direction is calculated by determining the angle of the apparent curvature vector relative to the local y-axis (in this case, a bend direction of zero means the curvature is in the direction of the y-axis).

$$\theta_b = \cos^{-1}\frac{\kappa_{app,y}}{\kappa_{app}} = \sin^{-1}\frac{\kappa_{app,z}}{|\kappa_{app}|} = \tan^{-1}\frac{\kappa_{app,z}}{\kappa_{app,y}} \quad (7)$$

Correcting the Measured Curvature Vector

At step 110, the measured curvature vector is determined. The measured curvature vector is based on strain values that are referenced to the initial fiber shape, i.e., the arbitrary initial shape set at step 102. Therefore, the curvature vector that is calculated in step 106 will not result in an accurate shape calculation. In order to correct the measured curvature vector, the curvature vector for the initial shape is added to the measured curvature vector, resulting in the corrected actual curvature $\kappa_{act}$ as shown as:

$$\kappa_{act} = \kappa_{app} + \kappa_{initial}$$

where $\kappa_{initial}$ depends on the arbitrary initial shape, e.g., zero for a straight shape or some non-zero value for a helix, curve, or other initial shape. The actual curvature vector can then be used to determine curvature and bend direction as is shown in equation (6) and (7), respectively. In the non-symmetrical case, equation (6) is replaced with equation (4).

Calculating Shape

At step 112, the shape of the fiber 15 of FIG. 1A to be measured is then calculated by the controller 26 of FIG. 1 based on the corrected curvature and bend direction measurements. This can be performed through many methods. One possible approach to conducting step 112 is to solve the known Frenet-Serret equations, as is described in detail in Moore '599 and summarized below.

Functional Operation

A key benefit of the present method 100 is that, in the case of symmetric core arrangements, it is not necessary to calculate bend direction in order to calculate curvature. The present method 100 is less sensitive to noise at lower strain levels by avoiding division by small numbers, whereas in prior art techniques, estimation of bend angle can be difficult when the strain measurement of a core used in the calculation is small.

The method 100 of FIG. 2 can be executed by the controller 26 of FIG. 1 using any of a wide variety of commercially available hardware platforms running mathematical software packages or custom-written code. The method 100 is platform-agnostic and thus does not rely on a given software platform. A multi-core fiber optic cable is connected to an interrogation system capable of measuring strain using sensors embedded in each of the fiber optic core, for instance FBGs.

To execute the method 100, the cable 10 of FIG. 1 must be secured at some known point. This represents the initial condition noted above. This secure point maintains a known initial tangent vector. Any shape sensing segment of the fiber cable may be free to twist as its own elasticity dictates during bending, as would be the case if it were held inside an adhesive-free tubing, e.g., the sleeve 23 noted above with reference to FIG. 1A. Peripheral to the method 100 is a suitable method of determining the actual curvature vectors of the arbitrary initial shape. As an example, if sleeving is woven into the fabric of an inflatable structure for the purpose of containing a multi-core shape sensing fiber, the location of the sleeving when the structure is fully inflated can be independently determined and initial curvature vectors can then be calculated for a multi-core fiber that is inserted into the sleeving.

The accuracy of the curvature and bend estimates conducted a part of the present method 100 is increased as the cores 12 are spaced farther from the center of the shape sensing fiber 15 of FIG. 1A. The accuracy is also increased by the addition of cores 12 to the fiber 15. A four-core shape sensing fiber, for example, would tend to be more accurate than a three-core fiber, and so on.

Maintaining the initial condition of the fiber 15 is important. Breakdowns of adhesives or other loosening of the initial condition mounting arrangement can affect system accuracy. The accuracy of the shape measurement will be affected by any error in the curvature correction process. If the curvature and bend direction of the initial shape contains error, the accuracy of the subsequently measured shape will be affected.

The prior art of Moore '599 discloses how to derive a shape solution using a multi-core fiber based on bending measurements made along the length of fiber, which is required to be free of extrinsic forces. Generally, the Frenet-Serret formulas and the corresponding fiber position relationship can be solved numerically after explicit functions of curvature and torsion are found. Curvature and torsion functions for the fiber are found by first calculating discrete sets of curvature and bend direction at specific points along the fiber, usually at sensor locations such as FBGs. In order to deduce curvature and bend direction in three dimensions, at least three separate core strains must be measured.

Figure 4A:
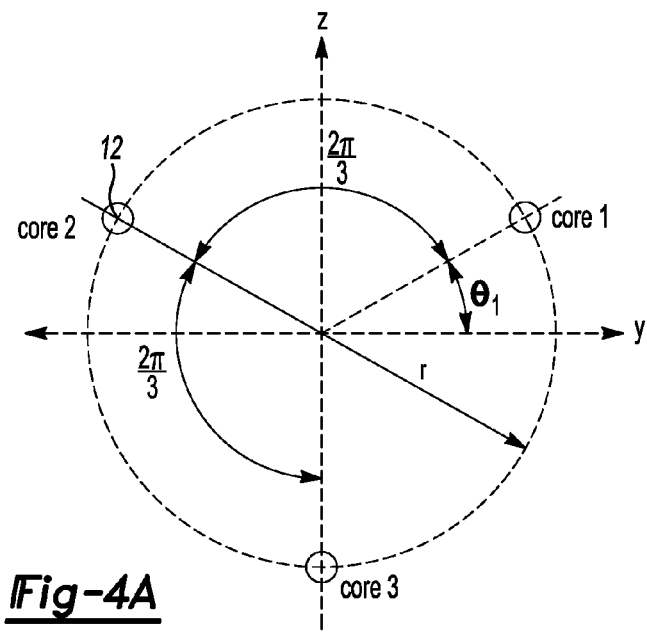
FIG. 4A is a schematic illustration describing the specific case of a fiber having a symmetrical three-core geometry.
Figure 4B:
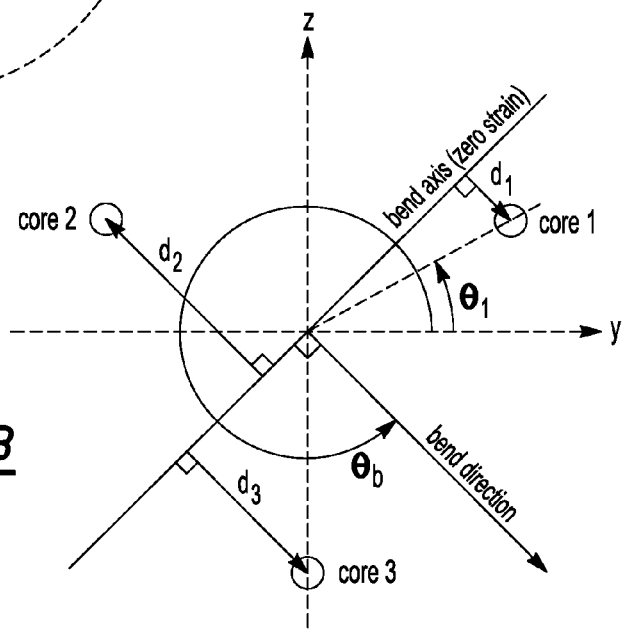
FIG. 4B is another schematic illustration of a fiber having a symmetrical three-core geometry.

FIGS. 4A and 4B detail the cross-sectional layout of a typical symmetric tri-core fiber. The locations of the cores 12 in the cross section of the fiber are defined by a radial offset from the center, r, and an angular separation of $2\pi/3$, with $\theta_1$ representing the offset of core 1 from the $\theta=0$ axis. Not shown are the cladding boundary and fiber coating described above with reference to FIG. 1A.

The orientation of the y-z axes in the fiber 15 would typically align with the orientation of the global y-z axes when the fiber 15 is in a straight configuration. The x-axis is pointing along the fiber 15 in the direction of increasing fiber length. A calibration of the orientation of the cores relative to the y-z axes is necessary before the calculations of bend direction can be carried out. Such a calibration typically consists of bending the fiber 15 in the direction of a known plane, measuring the induced strain in the bent sensors 24 (see FIG. 1), and calculating the core orientation which gives proper bend direction. The discrete sets of local curvature and bend direction can be calculated using known equations, and represented as:

curvature: $\kappa_{n=0...N}$ bend angle: $\psi_{n=0...N}$

At the "zero" point along the fiber 15, the typical assumption is that the fiber 15 is secured in a known position, usually straight, and therefore curvature is assumed to be zero. The bend angle at that point is arbitrary and is typically set to zero. The "zero" point along the fiber 15 is also usually defined as the point at which fiber length is zero:

$\kappa_0 = \psi_0 = s_0 = 0$

The discrete local curvature and bend direction sets are converted into curvature and bend direction functions using a curve fitting algorithm:

curvature: $\kappa(s) = \text{Fit}\{\kappa_{n=0...N}, S_{n=0...N}\}$ bend direction: $\psi(s) = \text{Fit}\{\psi_{n=0...N}, S_{n=0...N}\}$ The torsion function is found by differentiating the bend direction function:

$\tau(s) = \psi'(s)$

Initial conditions of the Frenet-Serret frame and fiber position are specified at s=0. The initial condition for position at fiber length zero is dictated by the actual physical position of the fiber in the global reference frame. The trivial choice is:

$(x_0, y_0, z_0) = (0,0,0)$.

The tangent vector initial value, $T_0$, is also dictated by the actual physical position of the fiber at $(x_0, y_0, z_0)$, in that $T_0$ must be "pointing" in the direction of increasing fiber length at s=0 in the global reference frame. A trivial choice is along a single axis; such is the case for the data presented in this paper, where $T_0$ is configured to run along the x-axis:

$T_0 = \hat{x}$

The specification of the normal vector initial value, $N_0$, is made in the global reference frame and acts to relate the fiber local reference frame to global reference frame at s=0. Because the normal vector points in the direction of bending, specifying $N_0$ is easily done using:

$N_0 = \cos(\psi(0))\hat{y} + \sin(\psi(0))\hat{z}$.

The Binormal vector initial value, $B_0$, is found using the Frenet-Serret frame definition that Binormal, normal, and tangent give an orthonormal frame:

$B_0 = T_0 \times N_0$

With initial conditions specified, the Frenet-Serret equations can be solved using numerical methods to give location of the fiber vs. fiber length, as well as the tangent, normal and binormal vectors along the fiber 15. The explicit system of equations in detail is:

$T'_x(s) = \kappa(s)N_x(s)$ $T'_y(s) = \kappa(s)N_y(s)$ $T'_z(s) = \kappa(s)N_z(s)$ $N'_x(s) = \kappa(s)T_x(s) + \tau(s)B_x(s); N'_y(s) = -\kappa(s)T_y(s) + \tau(s)B_y(s); N'_z(s) = -\kappa(s)T_z(s) + \tau(s)B_z(s)$ $B'_x(s) = -\tau(s)N_x(s)$ $B'_y(s) = -\tau(s)N_y(s)$ $B'_z(s) = -\tau(s)N_z(s)$ $x'(s) = T_x(s); y'(s) = T_y(s); z'(s) = T_z(s)$ Initial conditions are:

$x(0), y(0), z(0), T_x(0), T_y(0), T_z(0), N_x(0), N_y(0), N_z(0), B_x(0), B_y(0), B_z(0)$

The solution gives the position of the fiber 15 in three-dimensions as a function of the fiber length:

$\{x(s), y(s), z(s)\}$

Extrinsic Forces

Conventional methods exist for using multi-core fiber bending measurements in the solution of Frenet-Serret equations in the absence of external or extrinsic forces. Such forces can act on a fiber in such a way as to give measurement results that differ from the actual shape of the fiber. One such extrinsic force is axial strain. Under axial strain, sheathing of a fiber or an adhesive securing the fiber to a surface transfers loads into the fiber in the axial direction. While certain intrinsic behavior of the fiber is to be expected for any given fiber shape, any extrinsic behavior not directly related to the fiber shape can lead to inaccurate fiber shape measurements. The example method 200 of FIG. 6, which is described below in conjunction with FIG. 5, may be used to incorporate measured extrinsic effects into the calculation of shape and/or end position of a multi-core fiber, e.g., of the type used in the cable 10 of FIG. 1.

While a frictionless-sheathed fiber will typically be free of externally-induced loads, axial loading of the fiber can be externally-induced through attachment mechanisms, e.g., attachment to an undersea tow cable, tight weaving in an inflatable structure, attachment effects from tethered satellites, and extreme handling by a surgeon in the case of minimally invasive surgical catheters. In tight-bending situations, sleeving that is otherwise frictionless can be elliptical in cross-section to the point of tightening onto the fiber and transferring external loads into the fiber. Thus, the present method 200 accounts for extrinsic axial strain behavior of the fiber, unlike prior art approaches that assume such axial strain is zero.

Figure 5:
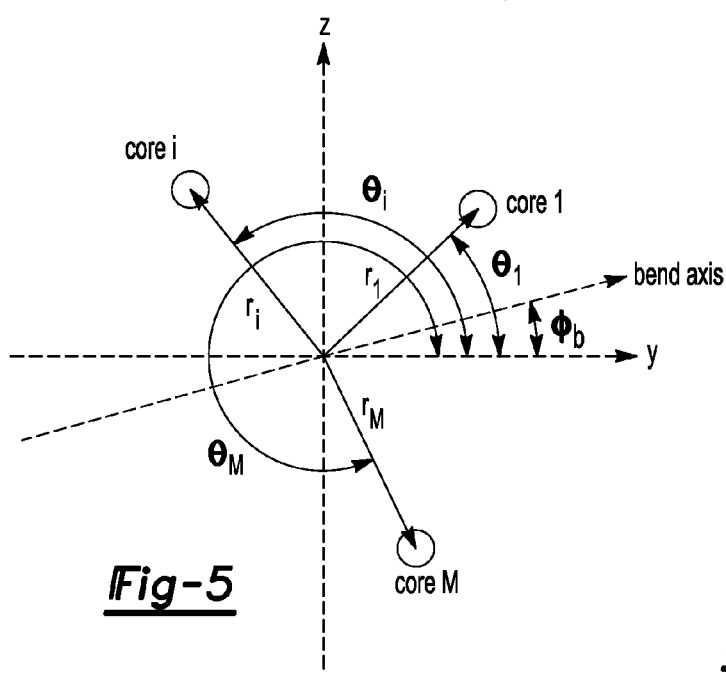
FIG. 5 is a schematic illustration describing the general case of an example M-core fiber cross-section.

Referring to FIG. 5, each core 12 is located a distance $r_i$ from the center of the fiber and has an angular offset from the y-axis of $\theta_i$. The y-z axes represent the local natural orientation of a Frenet-Serret frame. The angle $\Phi_b$ is the angular offset of the neutral bend axis from the y-axis. A fiber subjected to bending with no extrinsic axial forces will have zero strain along the bend axis of the cross section and the fiber length is assumed to be constant no matter the shape of the fiber. Conventional approaches such as that disclosed in Moore '599 can be used to deduce shape in such an instance.

However, if a fiber experiences axial forces, the fiber will have non-zero strain along its bend axis. In this case, the fiber length actually changes. The fiber will lengthen for positive strain and shorten for negative strain. The axial effects the fiber experiences can be location-dependent. That is the fiber may be experiencing positive strain in some sections and negative strain in other sections. The extrinsic axial effects which the fiber experiences are dependent on the application and can change from measurement to measurement. Various measurement techniques may be used to determine the applied strain along the neutral bend axis of a fiber, as is known by those having ordinary skill in the art. See for instance the applied strain value $\epsilon_a$ in equation (0) above.

Incorporating axial strain measurements into the solution of shape may be accomplished by using the axial strain information in the speed of the curve in the Frenet-Serret equations. In Moore '599, curvature and torsion are typically defined with the assumption that the measurements are made at some spacing that is constant throughout the fiber, such as at FBGs that are some repeated distance apart from one to the next. The method 200 of FIG. 6 uses the measured axial strain of the multi-core fiber 15 of FIG. 1A in determining the speed of the curve in the Frenet-Serret equations. This serves to shorten or lengthen the fiber 15 as necessary as the equations are being solved, thus giving the correct results even though the fiber length may change from measurement to measurement.

As noted elsewhere above, prior art approaches assume that an optical fiber is a linear elastic tube with no extrinsic forces acting in the axial or angular direction. Shape is induced into the multi-core fiber of the prior art through radial forces acting through a sleeving with an assumed frictionless inner surface. Such a frictionless inner surface is not required with the present approach. For instance, friction may be present that can induce twisting of the fiber. Due to such assumptions, prior art approaches assume that the material frame of the fiber follows its natural frame, i.e., the Frenet frame, of the curve theory describing its shape in three dimensions.

By way of contrast, in the method 200 disclosed below, any angular forces acting to twist the fiber of the cable 10 shown in FIG. 1 are accounted for by including the deviation of the material frame from the natural frame in a torsion function. The redefined torsion function then includes two angular rates of change one describing the rate of angular change of the Normal and Binormal vectors as a function of fiber length, and the other describing the rate of change of the orientation between the material frame and the natural frame.

Figure 6:
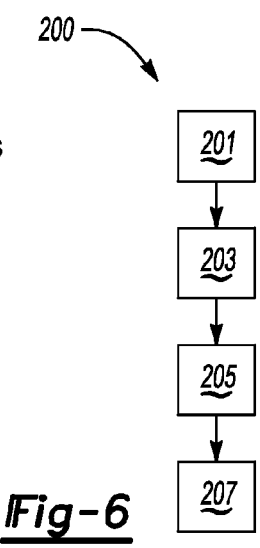
FIG. 6 is a flow chart describing an example method for determining 3D shape of the example cable of FIGS. 1 and 1A in the presence of bending, stretching, and twisting forces.

Referring to FIG. 6, the method 200 begins at step 201, wherein the equations for curvature κ(t), bending ψ(t), twisting φ(t), and strain E(t) are generated by curve fitting the corresponding discrete measured sets to give the following explicit functions:

$$\kappa(t_{i=0}^{i=N}),\ \psi(t_{i=0}^{i=N}),\ \phi(t_{i=0}^{i=N}),\ \text{and}\ E(t_{i=0}^{i=N}),$$

and to thereby obtain the following equations:

$$\kappa(t)=\text{Fit}\{\kappa_{t=0\ldots N},t\}$$

$$\psi(t)=\text{Fit}\{\psi_{t=0\ldots N},t\}$$

$$\phi(t)=\text{Fit}\{\phi_{t=0\ldots N},t\}$$

$$E(t)=\text{Fit}\{E_{t=0\ldots N},t\}$$

At step 203, the controller 26 of FIG. 1 derives a function of torsion vs. fiber length. The function may be represented as:

$$\tau(t)=\psi'(t)+\phi(t)$$

where φ(t) is the twist rate, e.g., in radians/meter. Those of ordinary skill in the art will appreciate that twist measurements can take alternative forms. Specifically, twist rate or absolute twist can be used by the controller 26 to derive the function of torsion vs. fiber length. Absolute twist may be represented as $\Phi_{n=0,\ldots N}$ (radians). Absolute twist and twist rate are related, by the following equations:

$$\Phi=\int\phi$$

$$\phi=\Phi'$$

Thus, step 203 may be executed by the controller 26 in a particular embodiment by differentiating the binding function ψ(t), differentiating the absolute twist function Φ(t), and then adding the two differentiated functions, i.e., ψ'(t) and Φ'(t) to derive the function of torsion vs. fiber length. This is represented mathematically as $$\tau(t)=\psi'(t)+\Phi'(t)$$

At step 205, the controller 26 sets the necessary initial conditions $r_0$, $T_0$, $N_0$, and $B_0=T_0 \times N_0$ for the known Frenet-Serret equations. The general form of the Frenet-Serret equations to be solved is:

$$T'(t)=\tilde{s}(t)(1+E(t))\kappa(t)N(t)$$

$$N'(t)=\tilde{s}(t)(1+E(t))(-\kappa(t)T(t)+\tau(t)B(t)$$

$$B'(t)=\tilde{s}(t)(1+E(t))\tau(t)N(t)$$

$$r(t)=r_0+\int \tilde{s}(t)(1+E(t))T(t)dt$$

Initial conditions of the Frenet-Serret formulas and fiber position are specified at t=0. The initial condition for position at fiber length zero is dictated by the actual physical position of the fiber in the global reference frame. The trivial choice is:

$$r_0 = (x_0, y_0, z_0) = (0,0,0)$$

The tangent vector initial value, $T_0$, is also dictated by the actual physical position of the fiber at $(x_0, y_0, z_0)$, in that $T_0$ must be "pointing" in the direction of increasing fiber length at t=0 in the global reference frame. A trivial choice is along a single axis, where $T_0$ is configured to run along the x-axis:

$$T_0 = \hat{x}$$

The specification of the normal vector initial value, $N_0$, is made in the global reference frame and acts to relate the fiber local reference frame to global reference frame at t=0. Because the normal vector points in the direction of bending, specifying $N_0$ is easily done using:

$$N_0 = \cos(\psi(0))\hat{y} + \sin(\psi(0))\hat{z}$$

The Binormal vector initial value, $B_0$, is found using the Frenet-Serret frame relationship that the Binormal, normal, and tangent vectors form an orthonormal frame:

$$B_0 = T_0 \times N_0$$

With initial conditions specified, the Frenet-Serret equations can be solved using numerical methods to give location of the fiber vs. fiber length, as well as the tangent, normal and Binormal vectors along the fiber.

At step 207, with $\tilde{s}(t)$ defining the sensor locations or measurement locations as a function t, the following system may be solved numerically via the controller 26 of FIG. 1:

$$T'_x(t) = \tilde{s}'(t)(1+E(t))\kappa(t)N_x(t),$$

$$N'_x(t) = \tilde{s}'(t)(1+E(t)) - \kappa(t)T_x(t) + \tau(t)B_x(t)),$$

$$B'_x(t) = -\tilde{s}'(t)(1+E(t))\tau(t)N_x(t),$$

$$T'_y(t) = \tilde{s}'(t)(1+E(t))\kappa(t)N_y(t),$$

$$N'_y(t) = \tilde{s}'(t)(1+E(t)) - \kappa(t)T_y(t) + \tau(t)B_y(t)),$$

$$B'_y(t) = -\tilde{s}'(t)(1+E(t))\tau(t)N_y(t),$$

$$T'_z(t) = \tilde{s}'(t)(1+E(t))\kappa(t)N_z(t),$$

$$N'_z(t) = \tilde{s}'(t)(1+E(t)) - \kappa(t)T_z(t) + \tau(t)B_z(t)),$$

$$B'_z(t) = -\tilde{s}'(t)(1+E(t))\tau(t)N_z(t),$$

$$x'(t) = \tilde{s}(t)(1+E(t))T_x(t),$$

$$y'(t) = \tilde{s}(t)(1+E(t))T_y(t),$$

$$z'(t) = \tilde{s}(t)(1+E(t))T_z(t).$$

The solution to the equations of step 207 gives the position $\{x(t), y(t), z(t)\}$, the tangent vector $\{T_x(t), T_y(t), T_z(t)\}$, the normal vector $\{N_x(t), N_y(t), N_z(t)\}$, and the bi-normal vector $\{B_x(t), B_y(t), B_z(t)\}$. The variable t is a parametric variable corresponding to a measurement number along the fiber 15 of FIG. 1A. A suitable control action can then be taken using the determined shape and position, e.g., with respect to the device 29 of FIG. 1.

The method 100 and 200 described above with reference to FIGS. 2 and 6, respectively, thus improve upon prior art approaches which assume that a fiber is a linear elastic tube with no extrinsic forces in the axial or angular direction. Shape is induced into the multi-core fiber of the prior art through radial forces acting through a sleeving with an assumed frictionless inner surface. Due to those assumptions, prior art approaches assume the material frame of the fiber follows the natural frame, i.e., the Frenet frame, of the curve theory describing its shape in three dimensions.

In the approach disclosed herein, any angular forces acting to twist the fiber are accounted for by including the deviation of the material frame from the natural frame in the torsion function. The redefined torsion function then includes two angular rates of change: one describes the rate of angular change of the Normal and Binomial vector as a function of fiber length and the other describes the rate of change of the orientation between the material frame and the natural frame.

While the best modes for carrying out the invention have been described in detail, those familiar with the art to which this invention relates will recognize various alternative designs and embodiments for practicing the invention within the scope of the appended claims.

The invention claimed is:

1. A method of determining the shape of a multi-core optical fiber, the method comprising:
    initializing a controller, including:
        positioning the multi-core fiber in an arbitrary initial shape;
        determining an initial curvature vector of the fiber that describes the arbitrary initial shape; and
        initializing strain measurements using the controller; and
    determining the shape of the fiber, including:
        positioning the fiber in a desired shape to be measured;
        measuring strain over a length of the fiber using a plurality of strain sensors while the cable is held in the shape to be measured, wherein the strain sensors are distributed along a length of each of the cores;
        defining a three-coordinate p-vector for each of the cores as a function of the distance of each respective core from a center point of the fiber and a bending angle of each respective core with respect to a local axis of the fiber, wherein the coordinates of the p-vector define a plane;
        calculating, via the controller, an applied strain value of the fiber using the p-vector and the measured strain;
        calculating strain due to bending as a function of the measured strain and the applied strain value;
        defining an apparent local curvature vector for each core of the fiber as a function of the calculated strain due to bending;
        calculating curvature and bend direction of the fiber using the apparent local curvature vector and the initial curvature vector; and
        determining the shape to be measured via the controller using the calculated curvature and bend direction.

2. The method of claim 1, further comprising:
    executing a control action with respect to the fiber using the determined shape.

3. The method of claim 1, wherein positioning the fiber in an arbitrary initial shape includes positioning the fiber in a non-straight initial shape.

4. The method of claim 1, wherein determining the shape of the fiber includes accounting for at least one extrinsic force acting on the fiber.

5. The method of claim 1, wherein measuring strain includes measuring a corresponding Bragg wavelength of each of a plurality of Fiber Bragg Gratings at different axial locations along a length of each of the cores.

6. The method of claim 1, wherein determining the shape of the fiber via the controller includes using the controller to solve Frenet-Serret equations.

7. The method of claim 1, further comprising:
recording discrete measured sets for each of: curvature, bending, twisting, and strain of the fiber;
performing a curve-fitting operation on each measured set to generate a curvature function, a bending function, a twisting function, and a strain function.

8. The method of claim 7, further comprising:
using the controller to calculate a function of torsion vs. fiber length, including differentiating the bending function and then adding the twisting function.

9. The method of claim 8, wherein determining the shape of the fiber via the controller includes solving a set of Frenet-Serret equations using each of the curve-fitted sets to thereby derive the position of the fiber in a three-dimensional space.

10. The method of claim 9, wherein solving the set of Frenet-Serret equations includes determining the position, tangent vector, normal vector, and bi-normal vector of the cable with respect to the three-dimensional space.

11. The method of claim 1, further comprising:
attaching a cable containing the fiber to a device;
wherein determining the shape of the fiber includes calculating the position of the device in three-dimensional space.

12. A system for determining a three-dimensional (3D) shape of a multi-core optical fiber, the system comprising:
a fiber optic cable having an optical fiber with a plurality of cores, and further having a plurality of strain sensors, wherein the strain sensors are configured to measure strain at different axial locations of each of the cores; and
a controller in communication with the plurality of strain sensors, wherein the controller is configured to:
calculate, using the measured strain, an applied strain value as an axial strain component experienced by all of the cores due to at least temperature and an axial load acting on the cable;
calculate strain due to bending of the fiber as a function of the measured strain and the applied strain value;
define an apparent local curvature vector for each core as a function of the calculated strain due to bending;
calculate curvature and bend direction of the fiber using the apparent local curvature vector and the initial curvature vector;
generate a curvature function, a bending function, a twisting function, and a strain function by performing a curve-fitting operation;
calculate a function of torsion vs. fiber length, at least in part by differentiating the bending function and adding the twisting function to the differentiated bending function; and
determining the shape of the cable via the controller in part by solving a set of Frenet-Serret equations using each of the curvature function, the bending function, the twisting function, and the strain function to thereby derive the shape of the cable in a three-dimensional space.

13. The system of claim 12, wherein the controller is configured to calculate the applied strain value using a p-vector and the measured strain values for each core.

14. The system of claim 12, further comprising:
a device connected to one end of the cable;
wherein the controller is configured to determine the position in three-dimensional space of the device using the determined shape of the cable.

15. The system of claim 12, wherein the arbitrary initial shape is a non-straight shape.

16. The system of claim 12, wherein the cable includes a sleeve which circumscribes the fiber, and wherein the sleeve is at least partially bound to the fiber.

17. A method of determining the shape of a multi-core fiber optic cable in the presence of extrinsic twisting and stretching forces, the method comprising:
recording discrete measured sets for each of: curvature, bending, twisting, and strain of the cable;
performing a curve-fitting operation on each measured set to generate a curvature function, a bending function, a twisting function, and a strain function;
using a controller to calculate a function of torsion vs. fiber length, including differentiating the bending function and then adding the twist function; and
determining the shape of the fiber via the controller in part by solving a set of Frenet-Serret equations using each of the curvature function, a bending function, a twisting function, and a strain function to thereby derive the shape of the fiber in a three-dimensional space.

18. The method of claim 17, wherein solving the set of Frenet-Serret equations includes determining the position, tangent vector, normal vector, and bi-normal vector of the cable with respect to the three-dimensional space.

19. The method of claim 17, wherein the fiber is bound to a sleeve of the cable such that the extrinsic forces include a twisting force imparted to the fiber by the sleeve.

20. The method of claim 17, further comprising:
winding the cable onto a spool such that the initial shape of the cable is helical.

* * * * *